United States Patent
Al Sayeed et al.

(10) Patent No.: US 10,985,838 B1
(45) Date of Patent: Apr. 20, 2021

(54) HANDLING COMPENSATION FOR LOSSES IN OPTICAL FIBER LINKS

(71) Applicant: Ciena Corporation, Hanover, MD (US)

(72) Inventors: Choudhury A. Al Sayeed, Stittsville (CA); David J. Miedema, Ottawa (CA); David Atkinson, Ottawa (CA)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 16/992,697

(22) Filed: Aug. 13, 2020

(51) Int. Cl.
*H04B 10/08* (2006.01)
*H04B 10/079* (2013.01)
*H04B 10/564* (2013.01)

(52) U.S. Cl.
CPC ... *H04B 10/07955* (2013.01); *H04B 10/0791* (2013.01); *H04B 10/0799* (2013.01); *H04B 10/564* (2013.01)

(58) Field of Classification Search
CPC .......... H04B 10/0795; H04B 10/07955; H04B 10/0791; H04B 10/0799; H04B 10/0797; H04B 10/564; H04B 10/70; H04B 10/2507; H04J 14/02; H04J 14/021; H04J 14/0221
USPC .. 398/33, 38, 79, 83, 34, 37, 158, 159, 160, 398/147, 81, 45, 48, 49, 177, 181, 59; 359/334, 337, 341.41, 341.42
See application file for complete search history.

(56) References Cited

U.S. PATENT DOCUMENTS

| | | |
|---|---|---|
| 8,364,036 B2 | 1/2013 | Boertjes et al. |
| 8,509,621 B2 | 8/2013 | Boertjes et al. |
| 9,060,215 B2 | 6/2015 | Miedema |
| 9,344,191 B2 | 5/2016 | Al Sayeed et al. |
| 9,485,013 B2 | 11/2016 | Al Sayeed et al. |
| 9,577,763 B2 | 2/2017 | Al Sayeed et al. |
| 9,768,902 B2 | 9/2017 | Al Sayeed et al. |
| 9,806,803 B2 | 10/2017 | Bownass et al. |
| 9,882,634 B1 | 1/2018 | Al Sayeed et al. |
| 9,906,294 B2 | 2/2018 | Al Sayeed et al. |
| 9,918,148 B2 | 3/2018 | Swinkels et al. |
| 9,973,295 B2 | 5/2018 | Al Sayeed et al. |
| 9,985,726 B1* | 5/2018 | Al Sayeed ......... H04B 10/0791 |
| 9,986,317 B1 | 5/2018 | Al Sayeed et al. |
| 10,063,313 B1 | 8/2018 | Al Sayeed et al. |
| 10,237,011 B2 | 3/2019 | Al Sayeed et al. |
| 10,257,596 B2 | 4/2019 | Swinkels et al. |
| 10,439,709 B1 | 10/2019 | Al Sayeed |
| 10,536,235 B2 | 1/2020 | Al Sayeed |
| 10,547,404 B1 | 1/2020 | Al Sayeed |
| 10,560,212 B2 | 2/2020 | Al Sayeed et al. |
| 10,587,339 B1 | 3/2020 | Al Sayeed et al. |
| 10,680,737 B1 | 6/2020 | Al Sayeed et al. |
| 10,680,739 B2 | 6/2020 | Swinkels et al. |
| 10,686,543 B1 | 6/2020 | Al Sayeed et al. |

(Continued)

*Primary Examiner* — Hanh Phan

(74) *Attorney, Agent, or Firm* — Clements Bernard Walker; Lawrence A. Baratta, Jr.; Christopher L. Bernard

(57) ABSTRACT

Systems and methods for measuring accumulated power losses over a fiber link are described in the present disclosure. According to one embodiment, a method includes the step of measuring accumulated losses over a fiber link. The method also includes the step of at least partially compensating for the measured accumulated losses. In response to determining that there is a compensation shortfall with respect to the accumulated losses, the method includes the step of transmitting the compensation shortfall to one or more downstream controllers.

20 Claims, 6 Drawing Sheets

(56) References Cited

U.S. PATENT DOCUMENTS

| | | | |
|---|---|---|---|
| 2004/0086274 A1* | 5/2004 | Wan | H04B 10/2935 |
| | | | 398/9 |
| 2006/0018658 A1* | 1/2006 | Mori | H04J 14/0221 |
| | | | 398/79 |
| 2015/0229528 A1 | 8/2015 | Swinkels et al. | |
| 2016/0182355 A1 | 6/2016 | Traxler et al. | |
| 2016/0218948 A1 | 7/2016 | Djukic et al. | |
| 2018/0084063 A1 | 3/2018 | Miedema | |
| 2019/0174211 A1 | 6/2019 | Swinkels et al. | |
| 2019/0253361 A1 | 8/2019 | Mackay et al. | |
| 2019/0349262 A1 | 11/2019 | Miedema et al. | |
| 2020/0059315 A1 | 2/2020 | Al Sayeed et al. | |
| 2020/0076499 A1 | 3/2020 | Al Sayeed et al. | |

* cited by examiner

HANDLING COMPENSATION FOR LOSSES IN OPTICAL FIBER LINKS

TECHNICAL FIELD

The present disclosure generally relates to optical network systems and methods. More particularly, the present disclosure relates to measuring losses in a fiber link of a photonic line system and distributing compensation to downstream controllers.

BACKGROUND

Generally, in the field of optical networking systems, data is communicated throughout an optical system along a number of optical fiber cables, fiber links, fiber spans, etc. Typically, signals lose power or attenuate at a predictable rate as they traverse a length of fiber. Thus, optical amplifiers may be arranged throughout the system to amplify the gain of the signals to a level where the signals can be received with sufficient power at the next node or element in the system.

Some amplifiers may be designed with associated controllers that can measure the amount of attenuation and correspondingly increase the gain of the amplifiers to compensate for the power loss. However, controllers are typically designed such that they are only concerned with the losses measured along an upstream fiber span. In this case, the controller can compensate for any changes in the power loss along this upstream fiber span by adjusting the gain as needed. However, the process of constantly adjusting the gain in such a reactive manner can lead to unwanted power fluctuations throughout the network. Therefore, there is a need in the field of optical networks to provide systems and methods for handling compensation for power losses in fiber spans while reducing power fluctuations.

BRIEF SUMMARY

The present disclosure is directed to systems and methods for compensating for power losses that are measured over an upstream fiber link. Instead of attempting to compensate for the entire power loss at one amplifier stage of a photonic line system, the embodiments described herein may spread out the compensation process over multiple amplifier stages. Thus, an amplifier at a first stage may be controlled by increasing its gain such that it compensates for a portion of a total amount of loss. Then, a shortfall can be communicated to a downstream controller to control an amplifier at a next stage where additional compensation can be made to handle the remaining amount of loss or a portion of the remaining amount. This may be continued over any number of stages and may include sending instructions for compensation to another section (e.g., Optical Multiplex Section (OMS)) downstream from the first stage. The additional fiber loss may be the result of a physically distressed fiber, such as a fiber pinch or other condition that might cause the fiber to experience more attenuation than a baseline level that might be based on the length of the fiber link.

According to one embodiment of the present disclosure, a local controller may include a processing device and a memory device configured to store a computer program which may include a loss compensation module. The loss compensation module of the computer program may have instructions that, when executed, enable the processing device to measure accumulated losses over a fiber link. The instructions may further enable the processing device to at least partially compensate for the measured accumulated losses. In response to determining that there is a compensation shortfall with respect to the accumulated losses, the processing device may be configured to transmit the compensation shortfall to one or more downstream controllers, which, for example, may allow for compensation by a later amplification stage of a photonic line system.

According to another embodiment of the present disclosure, a non-transitory computer-readable medium may be configured to store computer logic having instructions that, when executed, cause one or more processing devices to measure accumulated losses over a fiber link. The instructions may further cause the one or more processing devices to at least partially compensate for the accumulated losses. In response to determining that there is a compensation shortfall with respect to the accumulated losses, the instructions may also cause the one or more processing devices to transmit the compensation shortfall to one or more downstream controllers.

According to yet another embodiment of the present disclosure, a method is provided which may include the steps of measuring accumulated losses over a fiber link and at least partially compensating for the accumulated losses. In response to determining that there is a compensation shortfall with respect to the accumulated losses, the method may also include the step of transmitting the compensation shortfall to one or more downstream controllers, which may then allow for compensation for the remaining portion of the accumulated losses at one or more later amplification stages.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for compensating for power loss over fiber links of optical networks and photonic line systems. In addition to transmission loss that may be expected to occur over a given length of optical fiber, a fiber link may experience additional power losses. For example, a pinch in a fiber link may cause above-average losses. A fiber pinch may be the result of a fiber that is folded or bent beyond an acceptable bend radius or a fiber that has been compressed. Compression, for instance, may come from devices (e.g., zip ties, etc.) for keeping a group of cables together, a tool (e.g., pliers, etc.), wrapping fibers around a sharp corner, or from other situations where a fiber optic cable may experience less than optimal treatment.

Controllers may be arranged through a photonic line system to measure the total losses at a receiving end of a fiber link. The total losses (or accumulated losses) represent a loss in transmission power over a given fiber link. The total losses may include the normal attenuation loss (a baseline loss) plus any additional losses that may be experienced as a result the fiber link experiencing various undesirable conditions, such as pinching, compression, extreme temperature changes, aging of the fiber, degradation of the quality of the fiber, or other conditions that may cause physical distress or other undesirable states of the fiber link. Compensation for these losses may be handled in a number of different ways. In particular, the embodiments of the present disclosure are configured to handle power loss compensation such that undesirable power fluctuations can be reduced.

Figure 1:
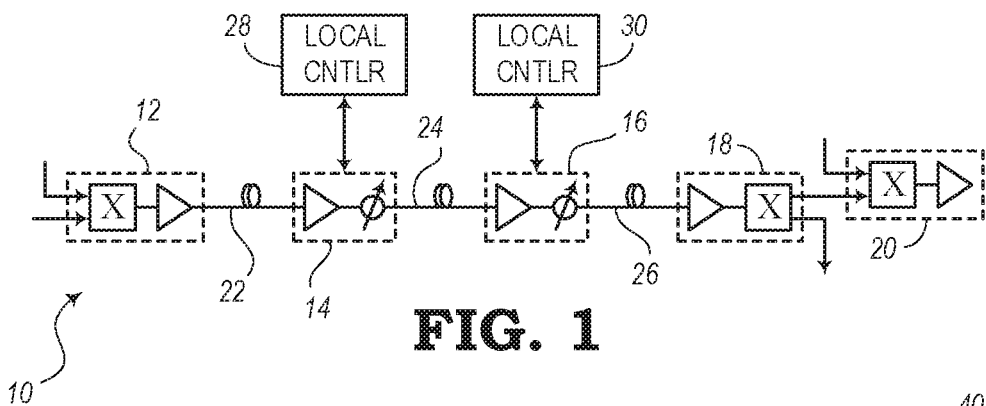
FIG. 1 is a schematic diagram illustrating a photonic line system with controllers configured to compensate for fiber loss, according to various embodiments.

FIG. 1 shows an implementation of a photonic line system 10 having a number of network elements connected by fiber links. Although the examples of photonic lines systems shown in FIGS. 1-8 illustrate transmission of signals in a single direction (i.e., from left to right on the page), it should be noted that the systems may be bi-directional, whereby the network elements may include equipment for transmission in the opposite direction as well (i.e., from right to left). However, for the sake of simplifying the explanation of the various implementations and embodiments, one direction is shown in the figures and described in the present disclosure.

The photonic line system 10 includes a first multiplexing element 12, first amplifying element 14, second amplifying element 16, demultiplexing element 18, and a second multiplexing element 20. The first multiplexing element 12 and first amplifying element 14 are connected by a first fiber link 22; the first and second amplifying elements 14, 16 are connected by a second fiber link 24; and the second amplifying element 16 and the demultiplexing element 18 are connected by a third fiber link 26.

Also, the photonic line system 10 includes a first local controller 28 and a second local controller 30, which may be configured to operate in a control plane of the photonic line system 10. The first local controller 28 is configured to measure power losses with respect to the first amplifying element 14 and, in response to the measured power loss, control the first amplifying element 14 to adjust its gain to compensate for the loss. Likewise, the second local controller 30 is configured to measure power losses with respect to the second amplifying element 16 and, in response to the measured power loss, control the second amplifying element 16 to adjust its gain to compensate for the loss. The first and second local controllers 28, 30 are configured for providing compensation based on controlling the power of their respective amplifying elements 14, 16. For fiber loss compensation, the local controllers 28, 30 are designed per span to compensate for any upstream fiber loss and adjust actuators of the respective amplifying elements 14, 16 to compensate for changes in the measured loss.

In the photonic line system 10, the local controllers 28, 30 are designed to compensate for any upstream fiber loss and any additional loss that may be result of a physical condition of the fiber link (e.g., fiber pinches, physical distress, aging, degradation, etc.). The local controllers 28, 30 can use actuators on the amplifying elements 14, 16 that are downstream from the lossy fiber links. To compensate for losses, the actuators can be configured to increase the amplifier gain and/or reduce the Variable Optical Attenuator (VOA) losses.

If, for any given fiber loss change, the local controller 28, 30 in incapable of sufficiently compensating for the losses or becomes out of dynamic range (e.g., having no amp gain and/or VOA loss available), then the respective amplifying element 14, 16 drops channel powers going to the downstream spans 24, 26, respectively, which incurs an additional link budget penalty. Since each local controller 28, 30 only focuses on compensating for loss on the immediate upstream fiber link, the downstream controllers (e.g., local controller 30, etc.) may not pick up a power offset coming from upstream in some situations. Hence, the power drop may continue to all downstream spans and may impact the link budget.

Each local controller 28, 30 may be configured to pick up power offsets coming from upstream. This may be done with an additional controller (e.g., a sectional controller) that can manage the photonic line system 10 or an entire section (e.g., node) of an optical network. Thus, the local controllers 28, 30 may operate with or without any sectional intervention. Each fiber link 22, 24, 26 may essentially be associated with a corresponding power controller (e.g., amplifying elements 14, 16, etc.). For any span loss change in an upstream span, the pairs of amplifiers and controllers (e.g., 14 and 28; 16 and 30; etc.) keep reacting to changes, which may generate power fluctuations over the network.

Figure 2:
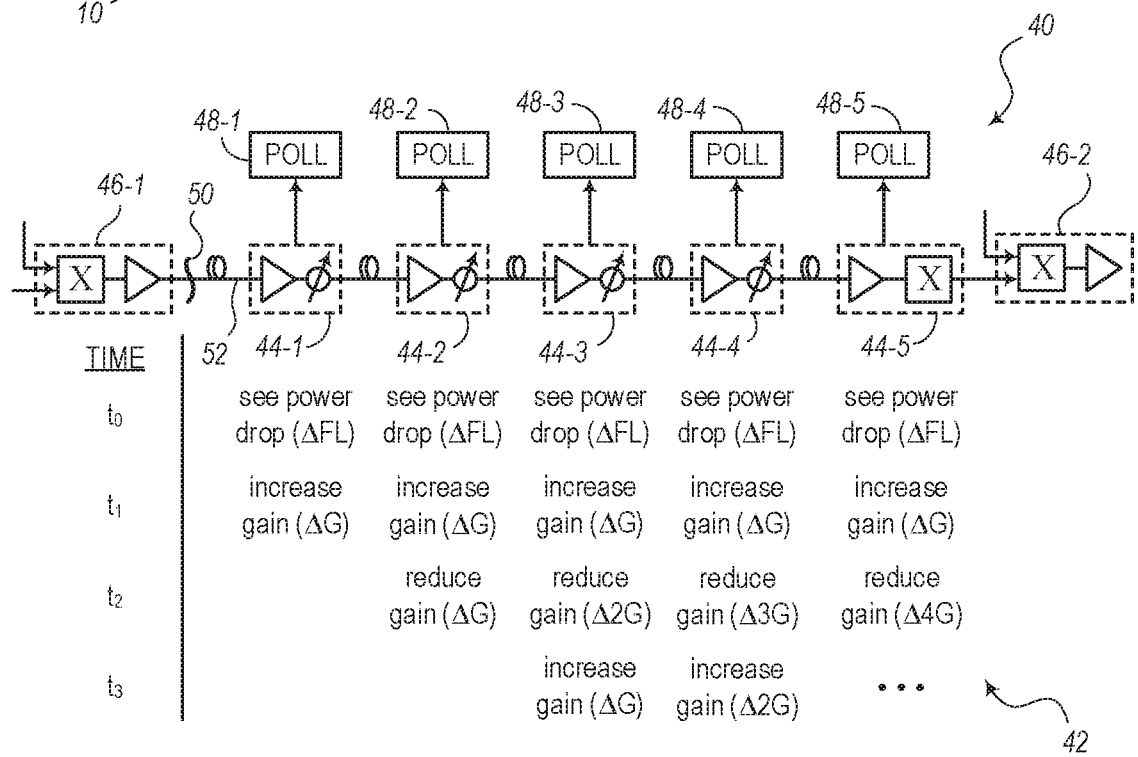
FIG. 2 illustrates a combination of a schematic diagram of a photonic line system and a chart illustrating loss compensation actions of corresponding controllers executed at different times, according to various embodiments.

FIG. 2 shows an implementation of a photonic line system 40 similar to the photonic line system 10 of FIG. 1. Also, FIG. 2 includes a chart 42 showing actions taken at each of a number of network elements in an attempt to compensate for power loss. The photonic line system 40 includes elements 44-1, 44-2, 44-3, 44-4, and 44-5 connected in a path between multiplexer elements 46-1, 46-2. In this implementation, elements 44-1, 44-2, 44-3, and 44-4 are amplifying elements and element 44-5 is a demultiplexing element. The photonic line system 40 further includes polling devices 48-1, 48-2, 48-3, 48-4, 48-5 for measuring power loss, which may be a total (accumulated power loss) or an additional loss that is determined to be above a normal baseline loss. The polling devise 48 may be part of a local controller (e.g., similar to the arrangement shown in FIG. 1) or any type of measurement or polling component. Each polling device 48 is configured to measure the loss from a corresponding element 44.

In this example, a physical distress 50 (e.g., pinch) or defect (e.g., fiber break) is present on an upstream fiber link 52, causing additional attenuation or loss on the fiber link 52. As a result of the physical distress 50, the polling devices 48 are configured to determine the additional loss, whereby an associated controller may adjust the gain of an amplifier or actuator of the elements 44 to compensate for the loss.

According to the chart 42, each of the polling devices 48 are configured at time $t_0$ to detect a drop (change) in power by a certain amount $\Delta FL$. As seen in the chart 42, each polling device 48 detects the loss $\Delta FL$ caused by the physical distress 50 before any actions are taken by any device to compensate for the loss. Since each polling device 48 may assume that the loss has been caused by a defect or other condition with respect to the immediate upstream fiber link, each polling device 48 will then attempt to compensate. Thus, as shown at time $t_1$, each of the controllers associated with the polling devices 48 increase the gain of its corresponding element 44 by $\Delta G$ (e.g., where $\Delta G=-\Delta FL$). However, it might be recognized at this point, that compensation is also simultaneously attempted at each of the previous elements 44.

After $t_1$, the second polling device 48-2 (having increased its gain by $\Delta G$) will see that the loss has already been compensated for by the previous amplifier (e.g., at the element 44-1) and that its own compensation provides a gain that is $\Delta G$ too high. To compensate for this $\Delta G$ overcompensation, the controller associated with the second polling device 48-2 will then reduce the gain by $\Delta G$ at time $t_2$.

Also, after $t_1$, the third polling device 48-3 (having increased its gain by $\Delta G$) will see that the previous amplifiers (e.g., associated with elements 44-1 and 44-2) already provide an overcompensation of $\Delta G$. Thus, the polling device 48-3 may attempt to compensate by reducing the gain by $42G$ at time $t_2$. After $t_2$ (after the controller associated with element 44-2 has reduced its gain), the controller with element 44-3 will need to increase its gain by $\Delta G$ again. It should be noted that this reactive approach can cause power fluctuations that can ripple through the section of the photonic line system 40.

The present disclosure is configured to address this issue and includes implementations and embodiments configured to provide a span loss compensation mechanism that can take out lack of pinch compensation from one span to downstream span within an Optical Multiplex Section (OMS) or section of the photonic line system 40. Some embodiments include solutions involving compensation within the section itself while other embodiments may include solutions that go beyond an OMS boundary. Also, some of the embodiments disclosed herein may also be configured where they do not require section-wide communications or messaging. Also, the embodiments may be configured to reduce or eliminate the network-wide transient power fluctuations and instability described above.

Figure 3:
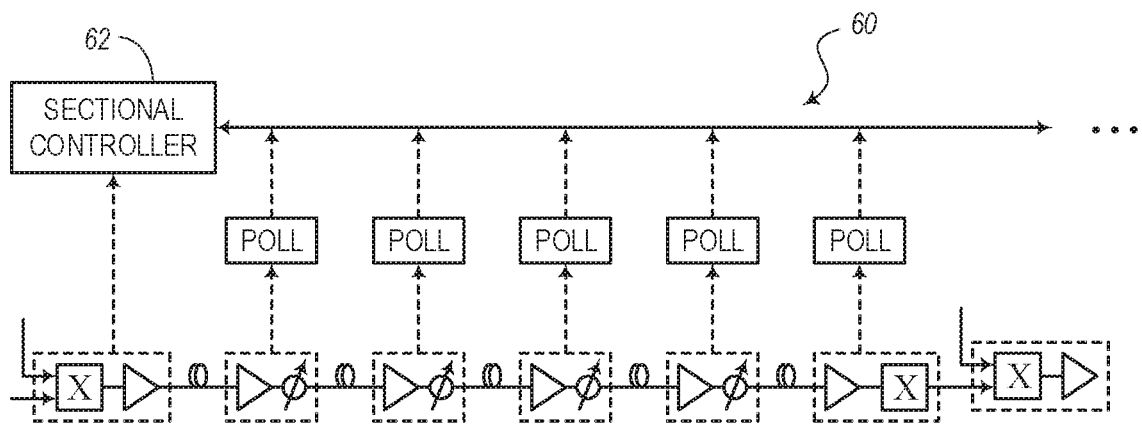
FIG. 3 is a schematic diagram illustrating a photonic line system having a sectional controller, according to various embodiments.

FIG. 3 is a schematic diagram illustrating another implementation of a photonic line system 60. In this implementation, the photonic line system 60 includes a sectional controller 62 in addition to elements similar to the photonic line system 40 of FIG. 2 including elements and polling devices associated with measuring and controlling the corresponding elements as described above.

According to the implementation of the photonic line system 60 of FIG. 3, a local controller (associated with the polling devices) runs on each fiber link to receive signals at the end of the corresponding fiber link and to provide a certain level of compensation for losses. The sectional controller 62 may be configured to run at a section head for an OMS. The sectional controller 62 may be configured to periodically poll each span for power data. In various embodiments, the poll may include measured or estimated power loss values.

From receiving the polls, the sectional controller 62 is configured to calculate for any power shortfall (beyond a normal baseline level or predefined launch target), referred to as a compensation shortfall. The sectional controller 62 accumulates all power offset calculations and then re-distributes the power offset compensation over the downstream fiber links within its control. The sectional controller 62 may store information related to a full topological view of the photonic line system 60 in order to be able to properly communicate over this entire section. If communication is interrupted for a given span, the sectional controller 62 may remain frozen until the issue can be resolved.

The sectional controller 62 may monitor channel power offsets in each span within an OMS and may provide control such that a lack of compensation from one span may be distributed to downstream spans, depending on which local controllers may have the necessary dynamic range to compensate for the offset. While this solution may be useful in many situations, this type of system depends on section-wide communication and messaging. That is, the sectional controller 62 will need to be configured with the ability to send message to every other controller within the OMS and the ability to read data from them on a timely fashion to make control decisions.

In some embodiments, the sectional controller 62 from an upstream OMS or photonic line system may pass power offset information to a downstream sectional controller associated with another (downstream) OMS. Each sectional controller in this case may run its own power and Optical Signal-to-Noise Ratio (OSNR) control to compensate for any per-channel power drop coming from upstream and uncompensated gain when an upstream OMS has managed to complete compensation on its own. However, there is a possibility that this can lead to instability to the network in some cases as sectional controllers, without proper limitations, may attempt to chase power offsets. Due to explicit communication dependency within sections, a network operator may try to use a sectional controller that can bookend an OMS using equipment from the same vendor.

It is possible to develop a power-control-based compensation mechanism for each local span controller that can compensate any uncompensated power offset coming from upstream without any sectional intervention (i.e., no section-wide communication dependency). This means that, for each local controller, if the incoming power drops, it increases the gain or reduces the VOA loss to achieve a given target power at a downstream fiber link. However, this method may cause downstream amplifiers to fluctuate with their gain or VOA losses caused by at least one or more upstream controllers also making similar adjustments. Again, this may generate ringing in the line system, although eventually the amplifiers will settle down to a final steady state. In some cases, such large power swings can have a negative impact on traffic.

The additional embodiments described below may provide improvements over the implementations described above with respect to FIGS. 1-3. Therefore, the embodiments of FIGS. 4-8 may be considered to be preferred embodiments. As such, one example of a controller that is proposed in the present disclosure may be configured to listen for accumulated fiber loss from an upstream fiber link and compare this accumulated fiber loss with a previously calibrated baseline loss. The controller may compensate for any additional losses, attenuations, or gain in the upstream span compared to this baseline loss and then transmit any uncompensated fiber loss to the immediate downstream controller or fiber link. For example, the accumulated fiber loss over a fiber link or span contains a currently measured fiber loss over the respective fiber link plus any uncompensated gain or attenuation coming from upstream links.

In one embodiment, two neighboring controllers may be configured to communicate with each other. Thus, the neighboring controllers can send power information (e.g., transmission power or receiving power) so that each controller can calculate a baseline span loss (e.g., equal to the upstream transmission power minus the downstream received power). This baseline span loss can be calculated when it is known that there are no physical distresses (e.g., pinches) or defects in the fiber link. Also, the neighboring controllers may be configured to communicate any uncompensated loss.

Figure 4:
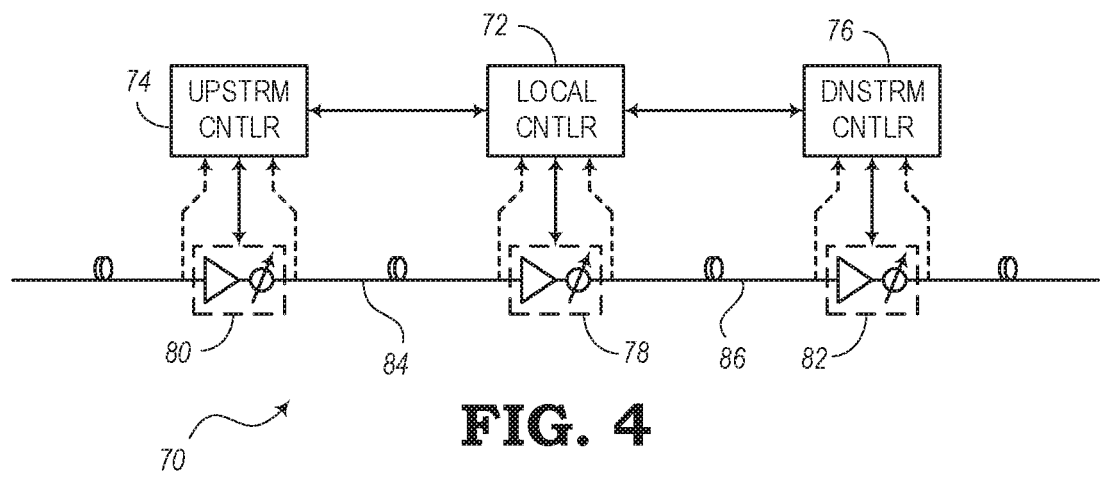
FIG. 4 is a schematic diagram illustrating a control system of a photonic line system having local controllers in communication with each other, according to various preferred embodiments of the present disclosure.

FIG. 4 is a schematic diagram illustrating an embodiment of a control system for a photonic line system 70. The control system includes local controllers in communication with each other. Reference is made with respect to the local controller 72 in between an upstream controller 74 and a downstream controller 76. The controllers 72, 74, 76 may operate in a control plane of the photonic line system 70.

The local controller 72 is configured to measure power levels with respect to a local network element 78 and provides control signals to the local network element 78 for adjusting gain or attenuation levels of an amplification element thereof. Also, the upstream controller 74 is configured to measure power levels with respect to an upstream network element 80 and provides control signals to the upstream network element 80 for adjusting gain or attenuation levels of an amplification element thereof, and the downstream controller 76 is configured to measure power levels with respect to a downstream network element 82 and provides control signals to the downstream network element 82 for adjusting gain or attenuation levels of an amplification element thereof. Also shown in FIG. 4 is an upstream fiber link 84 between the upstream network element 80 and the local network element 78 and a downstream fiber link 86 between the local network element 78 and the downstream network element 82.

The upstream controller 74 may be configured to measure a transmission power level at the upstream end of the fiber link 84 and the local controller 72 may be configured to measure a receiving power level at the downstream end of this fiber link 84. The local controller 72 and upstream controller 74 may then share these measurements with each other to enable a calculation of a fiber loss over the fiber link 84. Likewise, the local controller 72 may be configured to measure a transmission power level at the upstream end of the fiber link 86 and the downstream controller 76 may be configured to measure a receiving power level at the downstream end of this fiber link 86. The local controller 72 and downstream controller 76 may then share these measurements with each other to enable a calculation of a fiber loss over the fiber link 86.

According to the embodiment of FIG. 4, the control system (i.e., the combination of the local controller 72, upstream controller 74, and downstream controller 76) may be configured to use a peer-to-peer messaging based approach. For example, the controllers 72, 74, 76 may be configured to determine an accumulated fiber loss in addition to an amount of compensation that does not fully account for the entire accumulated fiber loss. This uncompensated amount may be referred to herein as a shortfall. Each controller may then communicate its "uncompensated loss" (or shortfall) to its neighbors. For example, the local controller 72 may communicate the shortfall to both the upstream controller 74 and the downstream controller 76, which are the immediately adjacent upstream and downstream neighboring controllers. Each controller 72, 74, 76 also listens for any negative fiber drawbacks (e.g., degradation, pinch, break, fault, etc.) from its immediate upstream fiber over time plus any "uncompensated loss" coming from its immediate upstream controller. In the illustrated embodiment, the local controller 72 listens for the uncompensated loss and/or information about the ramifications of an undesirable condition of a fiber. In this way, each controller avoids any direct power offset compensation and avoids instability in the network. Associated methods may also be configured to avoid section-wide messaging and communications dependency and may improve scalability.

Figure 5:
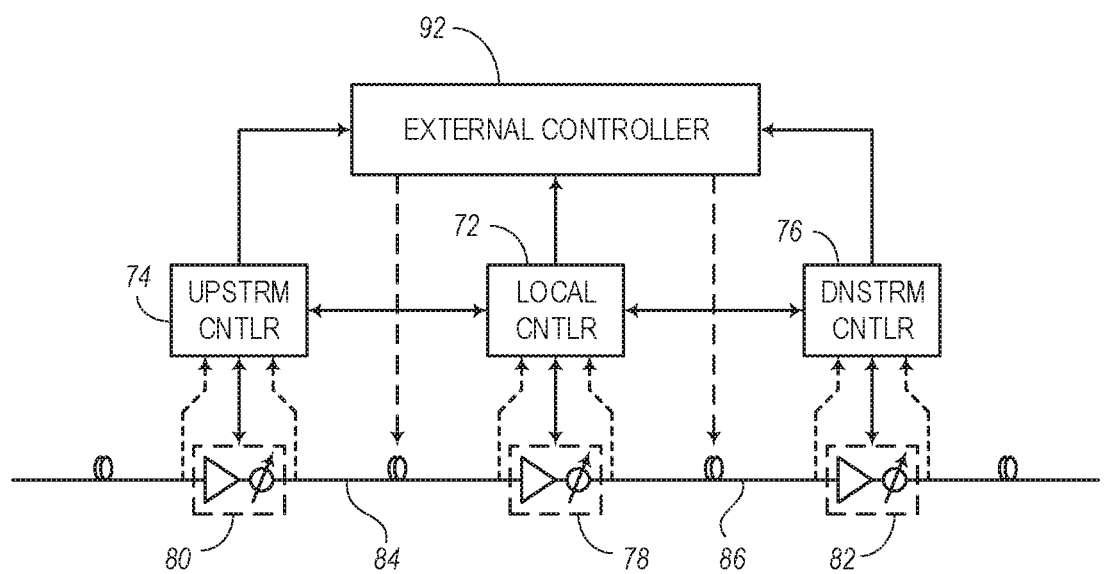
FIG. 5 is a schematic diagram illustrating another control system of a photonic line system having local controllers and an external controller, according to various preferred embodiments of the present disclosure.

FIG. 5 is a schematic diagram illustrating another embodiment of a control system of a photonic line system 90. The control system in FIG. 5 may include the same local controller 72, upstream controller 74, and downstream controller 76 described with respect to FIG. 4. In addition, the control system includes an external controller 92 in communication with multiple controllers (e.g., controllers 72, 74, 76). In some embodiments, the external controller 92 may be a Software-Defined Networking (SDN) controller.

The local controller 72 listens for the accumulated fiber loss obtained from the upstream fiber link 84 that can be externally measured and set on the local link object of the fiber link 84 by the external controller 92. That is, the external controller 92 can listen for transmit and receive power for a given fiber link and update fiber loss directly on the span. This alleviates any direct supervisory communication between two neighboring controllers to transfer transmit power information.

An advantage of the embodiment of FIG. 5 is that there would be no section-wide communication dependency. That is, if communication is impacted for a given span, then uncompensated loss might impact the network from that point onward, such that compensation capability for the whole section would not be compromised.

An advantage is that the control system of FIG. 5 alleviates the need for bookended OMS from the same vendor. In other words, one OMS may be connected to another OMS from a different vendor. Two neighboring controllers in different OMSs can communicate with each other via an external network management application or via a common communication protocol to transfer transmission and receiving power information and uncompensated loss values. Often, when section-based controllers are used, many vendors may try to keep the OMSs homogenous so that each network element within a section can communicate with the sectional controller using same language. However, the external controller 92 is able to communication externally with different OMSs. Also, with the embodiment of FIG. 5, the local controller 72 can listen for an accumulated fiber loss of an upstream link (e.g., fiber link 84) and does not have any dependency on the OMS-wide communication protocols.

In addition, the embodiment of FIG. 5 provides other advantages. For example, the control system can minimize the node-to-node messaging within a section. The scope on nodal messaging hence becomes per span. Also, section-wide messaging is typically expensive from the point of view of CPU performance as each node usually needs to send and process messages from all over the section. Limiting communication to a scope of "per span" can therefore improve the performance.

Another advantage is that the hop-by-hop approach can also be used to transfer uncompensated offset information from the last controller in an OMS (e.g., a local span controller) to the first controller on the next OMS (e.g., a channel controller). In this case, the immediate downstream controller in the next OMS may still compensate for any uncompensated loss coming from an upstream controller for a given set of upstream "express" channels, which is different than some systems that may blindly chase power offsets as a typical sectional controller may do.

FIGS. 6A-6E are schematic diagrams of an embodiment of a photonic line system 100 showing various processes and approaches for handling loss compensation according to some of the aspects of the present disclosure. In these figures, the photonic line system 100 includes a first multiplexing element 102, a first amplifying element 104, a second amplifying element 106, a demultiplexing element 108, and a second multiplexing element 110, similar to the embodiments described with respect to FIGS. 1-3. The first and second amplifying elements 104, 106 and the demultiplexing element 108 may be connected to control devices and/or polling components for measuring power levels and controlling actuating components of one or more amplifiers to adjust the power levels in order to compensate for any expected and/or additional attenuation on the respective upstream fibers. Also, as mentioned above, the controllers may be in communication with each other to communicate an shortfalls with regard to an amount of compensation that does not completely overcome a power loss due to an additional loss that may be suffered on account of a physical distress, pinch, compression, etc.

Also, the photonic line system 100 includes a fiber link 112 linking the first multiplexing element 102 and the first amplifying element 104. Another fiber link 114 links the first and second amplifying elements 104, 106 together. A third fiber link 116 links the second amplifying element 106 to the demultiplexing element 108; and a fourth fiber link 118 links the demultiplexing element 108 with the second multiplexing element 110. The photonic line system 100 may be configured to operate in a manner that is similar to the explanation provided above with respect to FIGS. 1-5. As described below, amplification shortfalls may be handled in different ways depending on various factors and/or different events that may occur in the photonic line system 100.

Furthermore, FIGS. 6A-6E show a situation where a power loss 120 is experienced because of some event on the fiber link 112. For example, the power loss 120 may be the result of a pinch in the fiber link 112, a physical distress in the fiber link 112, a break in the fiber link 112, an external compression applied to the fiber link 112 (e.g., equipment placed on top of an optical fiber cable), an improper installation of the fiber link 112 (e.g., bending the fiber link around a sharp corner), or other situation or condition that may cause a permanent or temporary decrease in optical power through the fiber link 112. The power loss 120 may be defined as a fiber loss having a value equal to $\Delta FL$.

Figure 6A:
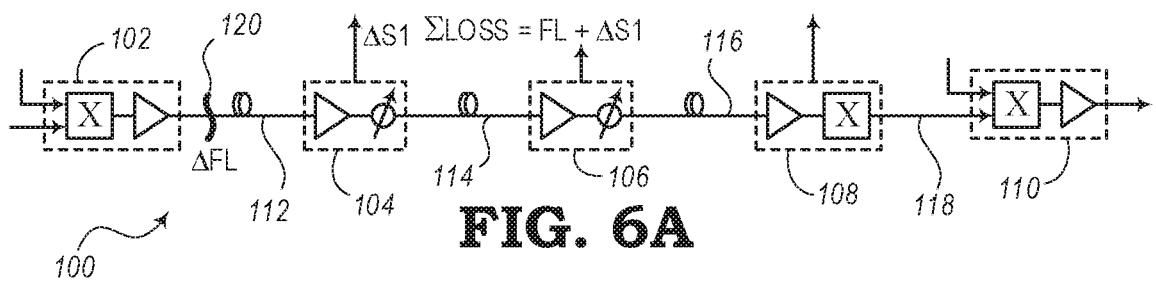
FIGS. 6A-6E are schematic diagrams illustrating different approaches for handling loss compensation, according to various embodiments of the present disclosure.

FIG. 6A illustrates a situation where the power loss 120 is detected at the first amplifying element 104. However, it may also be determined at this point that the respective controller may be out of dynamic range and is unable to compensate for the entire loss $\Delta FL$. In this case, the controller may control the first amplifying element 104 to increase the gain (by $\Delta G$) to compensate for a portion of the loss. The controller may also calculate a shortfall ($\Delta S$) equal to the total fiber loss $\Delta FL$ minus the partial compensation $\Delta G$. This shortfall $\Delta S$ is then published to the next controller associated with the second amplifying element 106. The controller associated with the second amplifying element 106 calculates the fiber loss associated with the fiber link 114 and adds in the shortfall $\Delta S$ from the previous stage to obtain a total loss. In the embodiment of FIG. 6A, the second controller associated with the second amplifying element 106 is configured to compensate for the entire shortfall be adjusting the gain. In this respect, the shortfall $\Delta S$ is accounted for in two stages, whereby the first stage is the partial compensation at the first amplifying element 104 and the second stage is the remaining compensation at the second amplifying element 106.

Figure 6B:
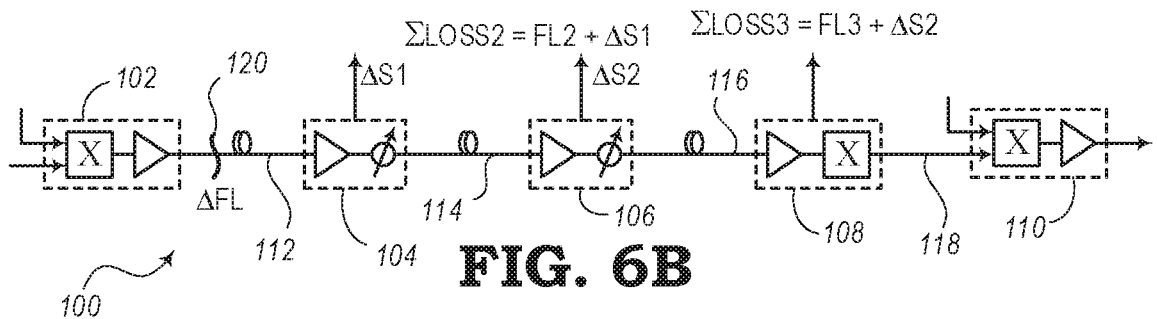

FIG. 6B shows an example where the photonic line system 100 requires more than the two stages to compensate for the power loss 120. Therefore, if both the first and second controllers (i.e., the controllers associated with the first and second amplifying elements 104, 106) are out of dynamic range to compensate for the entire power loss 120, a first shortfall is passed from the first amplifying stage to the second amplifying stage, and then a second shortfall is passed from the second amplifying stage to a downstream controller. In this example, the downstream controller is a controller associated with the demultiplexing element 108. This controller, according to the example of FIG. 6B, is able to compensate for the remaining shortfall and adjusts an actuator or amplifier of the corresponding demultiplexing element 108 accordingly.

In this respect, a power loss 120 may be detected with respect to a first fiber link (e.g., due to a fiber pinch) that may exceed an amount of loss that would typically be found along a properly operating fiber link. Instead of attempting to compensate for the loss in one fell swoop, which may cause undesirable fluctuations in the photonic line system 100, the compensation for the power loss 120 may be spread out among multiple downstream components. Thus, the downstream components can share in the responsibility of maintaining a proper power level in a gentler manner without causing large swings in amplification levels, which can create undesirable ringing. This may be accomplished by simple peer-to-peer control communication from one upstream controller to an adjacent downstream controller to publish the shortfall for which compensation can be provided to equalize the power level. It should be noted that this strategy may be able to provide a more gradual compensation without overcompensation.

Figure 6C:
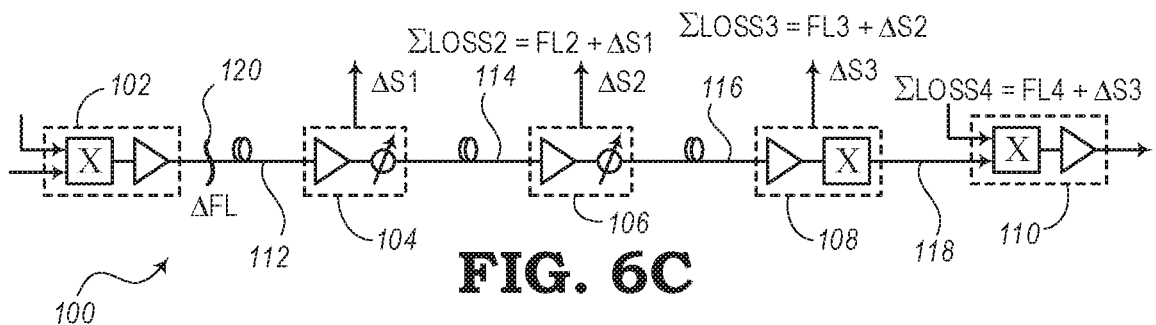

FIG. 6C shows an example where the demultiplexing element 108 is configured at an end of network element or node. In this case, the elements 102, 104, 106, and 108 are part of a first Optical Multiplex System (OMS) and the fiber link 118 is a degree fiber that is connected to another the multiplexing element 110 of a second OMS. According to this example, the controllers associated with the elements 104, 106, 108 may be out of dynamic range for compensating for the power loss 120. Each stage may be configured to provide partial compensation to account for a shortfall from an upstream stage, but may be unable to completely compensate for the shortfall in addition to the gain provided already for the normal fiber loss due to the attenuation along the respective fiber link. As such, the shortfall at the end of the OMS may be communicated to the next OMS to complete the compensation efforts. In this example, a controller associated with the multiplexing element 110 is configured to compensate for the total losses for channels coming from that specific degree (i.e., from the element 108). Also, the controller at the end of an OMS (e.g., the controller associated with the demultiplexer element 108) may be configured to raise an alarm if this element (at the end of the OMS) runs out of dynamic range.

Figure 6D:
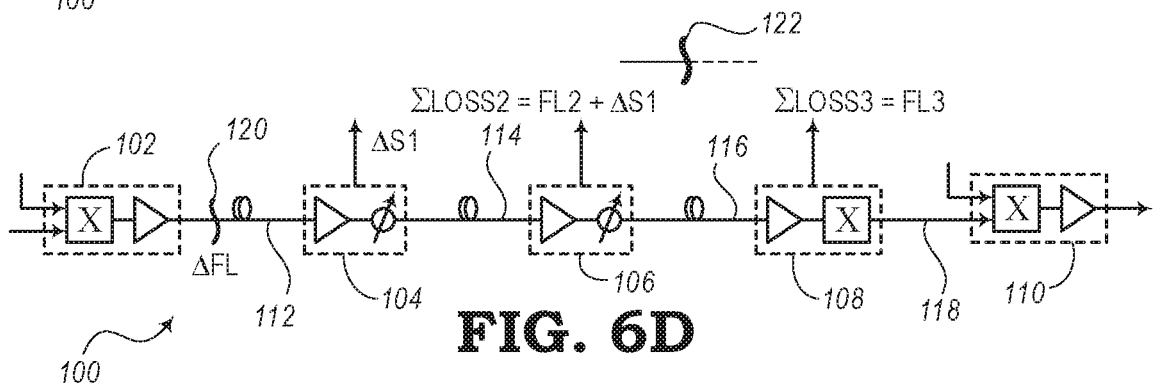

FIG. 6D shows a situation that may arise when any of the strategies related to the examples of FIGS. 6A-6C are employed. For example, if there is a loss 122 in the communication between the controllers associated with two adjacent elements (e.g., elements 106, 108), then the second element 108 will not receive information about a shortfall, if any. In this case, the controller is configured to remain in its previous state. That is, this controller may continue compensating for a shortfall if it was doing so before the loss 122 of communication. If it was not compensating for a shortfall, it will continue compensating for the regular attenuation along the upstream fiber link 116 but will not add supplemental compensation until communication is restored with its upstream neighbor. In some embodiments, the controller associated with the element 108 may continue communicating with its downstream neighbor and may provide a signal that upstream communication has been broken. In response to receiving this signal, the downstream controller may determine if there is a greater than normal amount of fiber loss and begin a new compensation process to restore the power level.

Figure 6E:
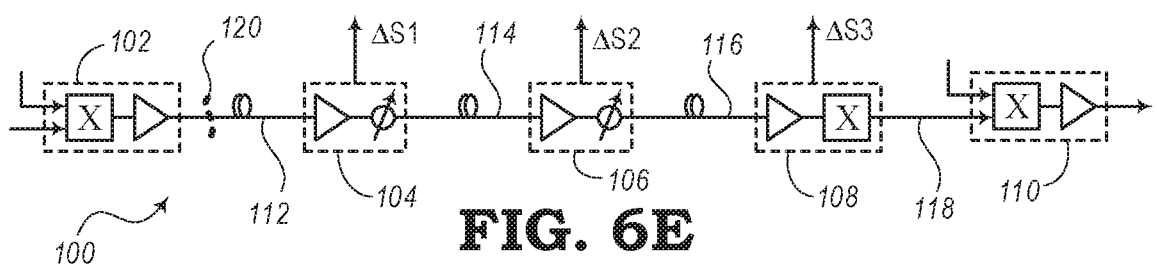

FIG. 6E shows a situation where the power loss 120 is no longer present. For example, the power loss 120 may be eliminated as a result of removing the issue (e.g., pinch) that caused the power loss 120 in the first place. Thus, any negative external condition or distress (e.g., fiber pinch, cable compressing, bending the fiber beyond its acceptable bend radius, etc.) of the fiber link 112 may reversed such as by a human un-pinching, un-compressing, unbending the cable, releasing tension in the cable, etc. In this situation, when the original problem has been removed, the controller associated with the first amplifying element 104 is configured to clamp an amplifier of the amplifying element 104 to a target power level to prevent any overshoots. Also, the controller is configured to remove any shortfalls that are being communicated to the downstream controllers. Thus, the downstream controller associated with the second amplifying element 106 may also be configured to clamp its respective amplifier to a target power level to prevent any overshoots and also removes any shortfall communication to its downstream controller, and so on, depending on how many stages are involved with the multiple stage compensation efforts. The controllers can use the amplifier's power clamp capabilities to avoid any overshoots into the photonic line system 100. For example, this may be done by presetting a clamp target level equal to a previously calibrated baseline power level equal to the power level before any distress or pinch compensation efforts began.

Figure 7:
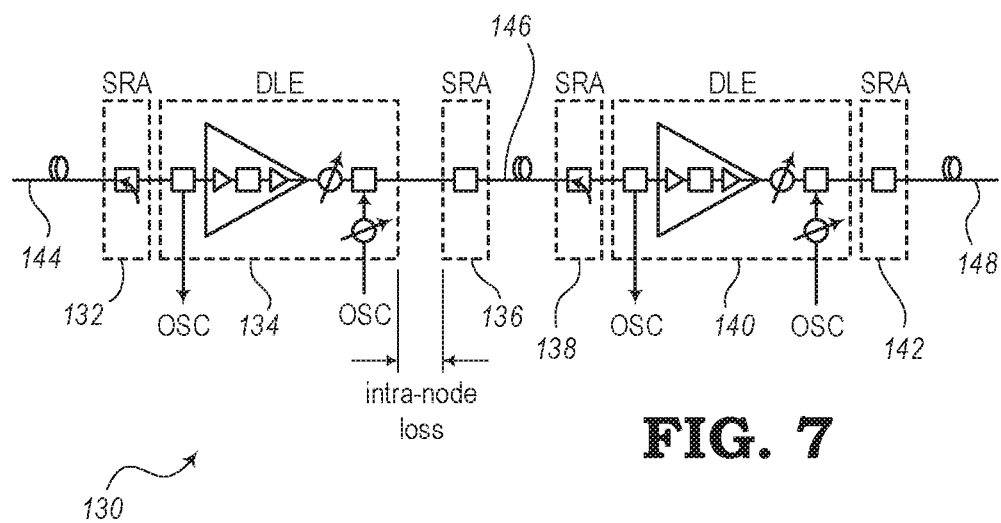
FIG. 7 is a schematic diagram illustrating a system for handling loss compensation in a photonic line system, according to various embodiments of the present disclosure.

FIG. 7 is a schematic diagram illustrating an embodiment of a system for handling loss compensation in a photonic line system 130. The photonic line system 130 of FIG. 7 includes a first SRA element 132, a first DLE element 134, a second SRA element 136, a third SRA element 138, a second DLE element 140, and a fourth SRA element 142. A first fiber link 144 is connected at an input to the first SRA element 132. A second fiber link 146 is connected between the second and third SRA elements 136, 138. Also, a third fiber link 148 is connected at an output of the fourth SRA element 142. A first difference in Total Loss of Power (dTLP) is measured at an output of the second SRA element 136 to the fiber link 146. A second dTLP is measured at an output of the fourth SRA element 142 to the fiber link 148.

Normal attenuation is detected to obtain an initial calibration along each of the fiber links 144, 146, 148. Once initial calibration is completed (e.g., token passed) for a node, a routine for an intra-node fiber loss compensation process (e.g., for DLE-to-SRA fiber loss) begins. An intra-node fiber loss compensator is configured to monitor a DLE-to-SRA fiber loss, where:

DLE-to-SRA fiber loss=Total Power Out($P_{DLE}$)−
Total Power In($P_{SRA}$).

This fiber loss can be saved locality and/or reported to adjacent controllers.

Monitoring may be done either periodically or based on when an event is detected. If intra-node fiber loss changes by an amount greater than a "dead zone," the compensator updates the Variable Optical Attenuator (VOA) attenuation level accordingly to the achieved dTLP. If VOA is at a minimum attenuation, the controller may notify the downstream peer to include the uncompensated loss as part of its composite fiber loss calculation. That is, the downstream controller may include this upstream uncompensated loss only with a notification from the upstream controller.

For every iteration, t, or based on an event-driven notification (e.g., when a loss is greater than the dead zone changes), the controller may be configured to find a current VOA attenuation and a current DLE-to-SRA fiber loss (t). If fiber loss (t)−fiber loss (t−1)>dead zone (e.g., 0.2 dB), then the controller may perform the following:
 a) Set VOA attenuation to the VOA attenuation t−(fiber loss (t)−fiber loss (t−1));
 b) Limit <0, 20 dB> {VOA Attenuation}; and
 c) Also, if VOA attenuation=0 dB, the controller may set:
  1. Uncompensated offset=Target dTLP−measured SRA Out; and
  2. Uncompensated offset >dead zone (0.2 dB) and notify downstream peer to compensate for the offset.

Figure 8:
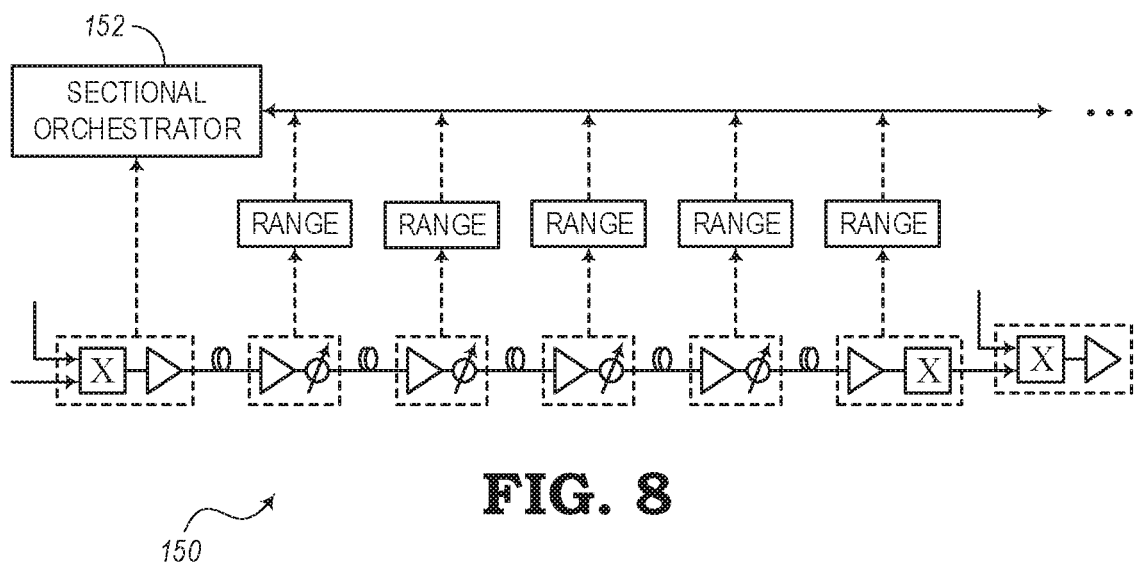
FIG. 8 is a schematic diagram illustrating another system for handling loss compensation in a photonic line system, according to various embodiments of the present disclosure.

FIG. 8 is a schematic diagram illustrating another system for handling loss compensation in a photonic line system 150. The photonic line system 150 may include a structure similar to the photonic line system 60 of FIG. 3 and may include a section orchestrator 152 configured to receive a value indicative of a dynamic range for loss compensation from the controllers associated with the amplifying elements.

Each In-line Light Amplifier (ILA) node and Rated Load Amplifier (RLA) pre-amplifying device (e.g., controller) may be configured to locally publish the available dynamic range after finishing the compensation. The sectional orchestrator 152 listens for an idle state from each of the local controllers and receive the value of the available dynamic range. If the available dynamic range is reported as −ve and an uncompensated offset is greater than dZ (e.g., 0.2 dB) for any given span, the offset value is distributed to the next downstream spans based on their available dynamic range.

Figure 9:
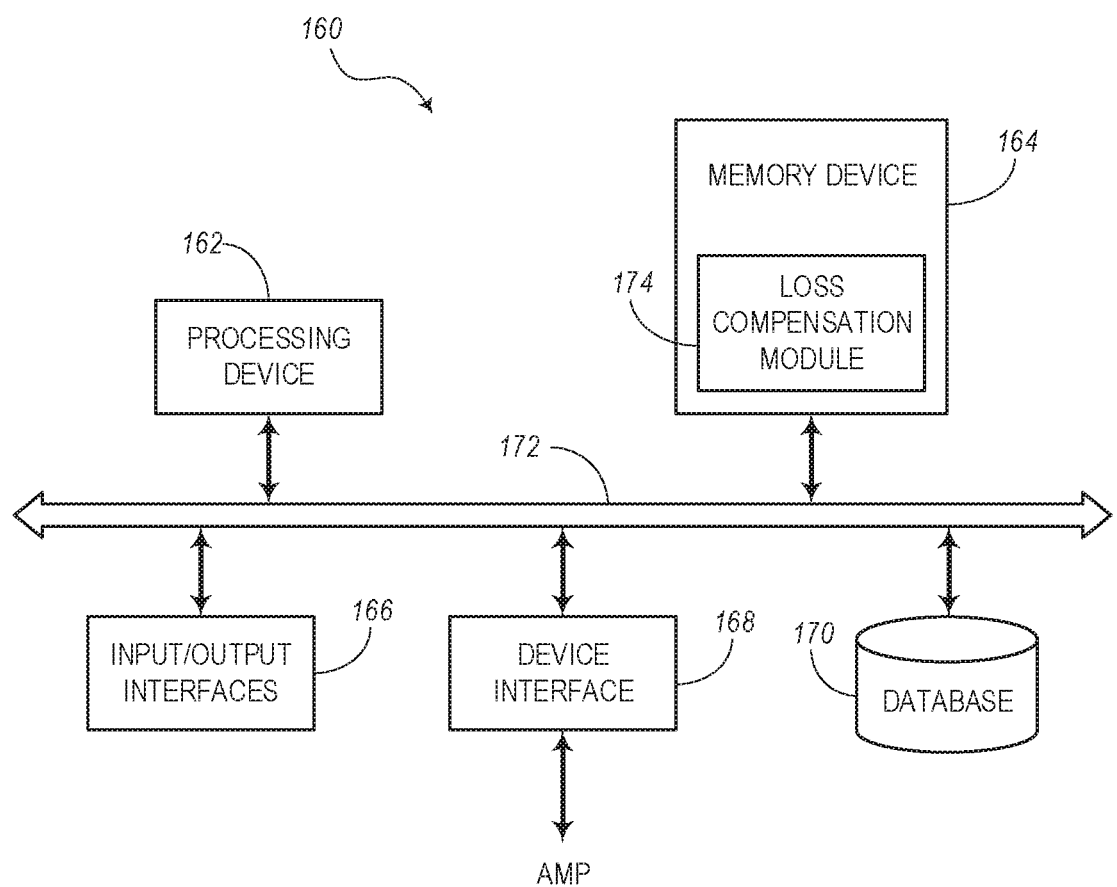
FIG. 9 is a block diagram illustrating a computing system of a controller for controlling adjustments to an amplifier to compensate for fiber link loss, according to various embodiments of the present disclosure.

Each local controller compensates for its local fiber loss offset+the upstream uncompensated offset. For the last span, if the dynamic range is reported as −ve and the uncompensated offset is greater than dZ (0.2 dB), then this may be reflected on all switch out power profiles. In other words, the switch out profiles may be re-taken from the measured OCM. At any given time, the sectional orchestrator 152 may ensure that $\Sigma LocaluncompOffset_i = \Sigma UpstreamUncompOffset_i$ FIG. 9 is a block diagram illustrating an embodiment of a computing system 160 of a controller for controlling adjustments to an amplifier to compensate for fiber link loss in a photonic line system, such as the photonic line systems described above. The computing system 160 may be configured as a local controller, sectional controller, section orchestrator, or other control devices as described in the present disclosure. In the illustrated embodiment, the computing system 160 may be a digital computer that, in terms of hardware architecture, generally includes a processing device 162, a memory device 164, Input/Output (I/O) interfaces 166, a device interface 168, and a database 170. The memory device 164 may include a data store, database (e.g., database 170), or the like. It should be appreciated by those of ordinary skill in the art that FIG. 9 depicts the computing system 160 in a simplified manner, where practical embodiments may include additional components and suitably configured processing logic to support known or conventional operating features that are not described in detail herein. The components (i.e., 162, 164, 166, 168, 170) are communicatively coupled via a local interface 172. The local interface 172 may be, for example, but not limited to, one or more buses or other wired or wireless connections. The local interface 172 may have additional elements, which are omitted for simplicity, such as controllers, buffers, caches, drivers, repeaters, receivers, among other elements, to enable communications. Further, the local interface 172 may include address, control, and/or data connections to enable appropriate communications among the components 162, 164, 166, 168, 170.

The processing device 162 is a hardware device adapted for at least executing software instructions. The processing device 162 may be any custom made or commercially available processor, a Central Processing Unit (CPU), an auxiliary processor among several processors associated with the computing system 160, a semiconductor-based microprocessor (in the form of a microchip or chip set), or generally any device for executing software instructions. When the computing system 160 is in operation, the processing device 162 may be configured to execute software stored within the memory device 164, to communicate data to and from the memory device 164, and to generally control operations of the computing system 160 pursuant to the software instructions.

It will be appreciated that some embodiments of the processing device 162 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 162 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 166 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 166 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The device interface 168 may be used to enable the computing system 160 to communicate with a corresponding amplifier or actuator associated with an amplifier. In some embodiments, the device interface 168 may also be configured as a network interface to communicate over a network, such as over the photonic line systems 10, 40, 60, 70, 90, 100, 130, 150, the Internet, a Wide Area Network (WAN), a Local Area Network (LAN), and the like. The device interface 168 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The device interface 168 may include address, control, and/or data connections to enable appropriate communications on the network.

The memory device 164 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 164 may incorporate electronic, magnetic, optical, and/or other types of storage media. The memory device 164 may have a distributed architecture, where various components are situated remotely from one another, but can be accessed by the processing device 162. The software in memory device 164 may include one or more software programs, each of which may include an ordered listing of executable instructions for implementing logical functions. The software in the memory device 164 may also include a suitable Operating System (O/S) and one or more computer programs. The 0/S essentially controls the execution of other computer programs, and provides scheduling, input-output control, file and data management, memory management, and communication control and related services. The computer programs may be configured to implement the various processes, algorithms, methods, techniques, etc. described herein.

The memory device 164 may include a data store used to store data. In one example, the data store may be located internal to the computing system 160 and may include, for example, an internal hard drive connected to the local interface 172 in the computing system 160. Additionally, in another embodiment, the data store may be located external to the computing system 160 and may include, for example, an external hard drive connected to the Input/Output (I/O) interfaces 166 (e.g., SCSI or USB connection). In a further embodiment, the data store may be connected to the computing system 160 through a network and may include, for example, a network attached file server.

Moreover, some embodiments may include a non-transitory computer-readable storage medium having computer readable code stored in the memory device 164 for programming the computing system 160 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 162 that, in response to such execution, cause the processing device 162 to perform a set of operations, steps, methods, processes, algorithms, functions, techniques, etc. as described herein for the various embodiments.

In particular, the memory device 164 may be configured to store a loss compensation module 174 configured to enable the processing device 162 to perform logic instructions of the loss compensation module 174 in order to compensate for measured power loss over an upstream fiber optical cable or fiber link according to the processes and techniques described throughout the present disclosure. According to some embodiments, the loss compensation module 174 can be implemented in any combination of hardware, software, and/or firmware in the processing device 162 and/or memory device 164.

Figure 10:
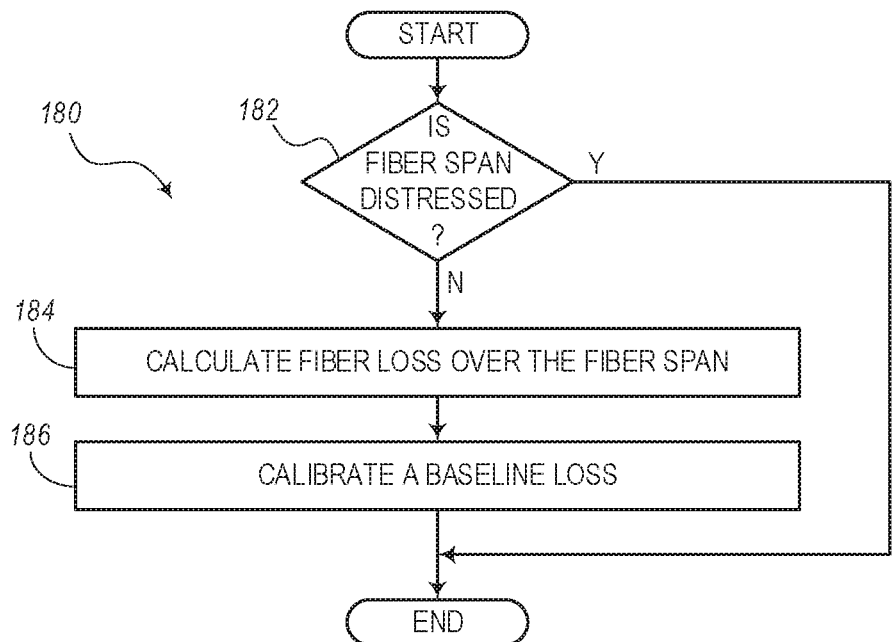
FIG. 10 is a flow diagram illustrating a process for determining a baseline compensation to which future loss measurements can be compared, according to various embodiments of the present disclosure.

FIG. 10 is a flow diagram illustrating an embodiment of a process 180 for determining a baseline compensation to which future loss measurements can be compared. The process 180 includes determining, as indicated in decision diamond 182, if a fiber link is distressed or experiencing some other type of physical event (e.g., a fiber pinch) that causes the fiber link to provide additional amounts of power loss over the fiber link beyond an anticipated attenuation due to normal signal loss over a length of a transmission line or optical line. If the fiber link is pinched or experiencing other distress, then an optimal operating condition cannot be measured and the process 180 comes to an end. Otherwise, if it is determined that the fiber link is not distressed (e.g., not pinched), then the process 180 proceeds to block 184.

As indicated in block 18r, the process 180 includes calculating a fiber loss over the fiber link. This will be recognized as the anticipated or expected attenuation due to a length that a transmission signal propagates. The calculated fiber loss in this case is calibrated to determine a baseline compensation, as indicated in block 186. This baseline compensation value corresponds to a gain or attenuation level that an amplifier can be set to in order to compensation for the baseline attenuation or calculated fiber loss under normal conditions (i.e., when there is no distress to the fiber link, when the fiber link is free of a physical distress or pinch, when the fiber link is not degraded due to age, etc.).

Figure 11:
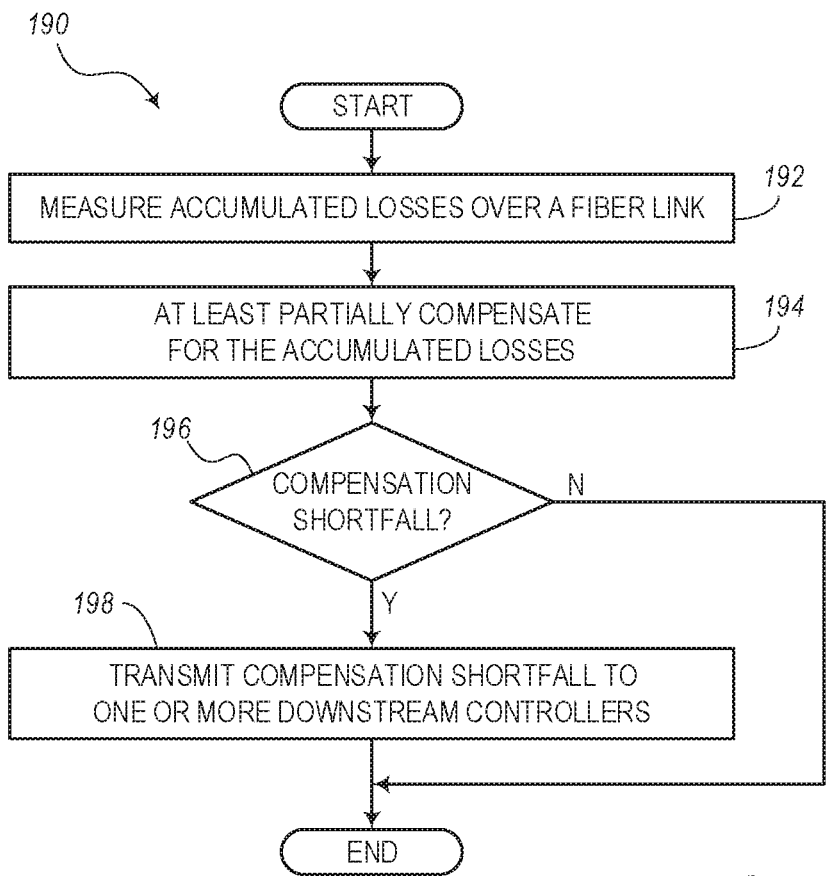
FIG. 11 is a flow diagram illustrating a process for handling power losses in a photonic line system, according to various embodiments of the present disclosure.

FIG. 11 is a flow diagram illustrating an embodiment of a process 190 for handling power losses in a photonic line system. The process 190 may be performed by a local controller (e.g., local controller 28, 30, 72, etc.) and/or an external controller (e.g., sectional controller 62, external controller 92, sectional orchestrator 152, etc.). The process 190 includes a step of measuring accumulated losses over a fiber link, as indicated in block 192. For example, the accumulated losses may be considered to be a total amount of loss that a signal experiences while propagating over the fiber link and may represent both a baseline (expected) loss and any additional loss that might be caused by some distress or other negative condition of the fiber link.

The process 190 may include the step of at least partially compensating for the measured accumulated losses, as indicated in block 194. For example, an amplifier may be configured to only provide gain up to a certain level, whereby, if the measured accumulated losses exceed that level, then the amplifier does not have the available dynamic range to completely compensate for the losses. In this case, the amplifier may be adjusted or set to compensate for at least a portion of the measured accumulated losses as described in block 194. Also, in order to minimize ringing, fluctuations, overcompensations, etc., the controllers and amplifiers may be configured such that compensation for the total losses is not attempted at just a first stage of compensation.

The process 190 also includes determining whether there is a compensation shortfall for the accumulated losses, as indicated in decision diamond 196. The shortfall, for example, may be calculated by the measured accumulated losses minus the partial amount of compensation handled by the first amplifier. If there is no compensation shortfall (i.e., the first compensation stage is capable of compensating for the accumulated or total losses), then the process 190 ends. However, if there is a compensation shortfall, then the process 190 proceeds to block 198. As indicated in block 198, the process 190 includes transmitting the compensation shortfall to one or more downstream controllers. For example, a local controller may be configured to transmit a control signal having information about the compensation shortfall to the one or more downstream controllers in order that the shortfall can be handled in a later stage. This transmission enables the one or more downstream controllers to provide compensation in one or more additional compensation stages. Again, this process may be repeated at the next stage to spread out the compensation efforts to multiple amplifiers. In some embodiments, the next stage may be a downstream OMS, where compensation can be completed to return the power level to a desired level.

The present disclosure therefore provides systems and methods for handling the compensation of fiber loss within a photonic system. In some embodiments, the systems and methods may allow OMS level span loss compensation without having a section-wide communication dependency and without causing any instability that typical local power controllers tend to create in the line system. Also, some embodiments may allow the concept of sharing uncompensated loss (not per channel power offset) between two OMSs, without a section-head to section-head communication.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A local controller comprising
a processing device, and
a memory device configured to store a computer program having instructions that, when executed, enable the processing device to
measure accumulated losses over a fiber link,
at least partially compensate for the accumulated losses, and in response to determining that there is a compensation shortfall with respect to the accumulated losses, transmit the compensation shortfall to one or more downstream controllers.

2. The local controller of claim 1, wherein the accumulated losses are compared with a baseline loss to determine a fiber loss change.

3. The local controller of claim 2, wherein the fiber loss change is due to at least one of a physical distress of the fiber link, a pinch of the fiber link, and aging of the fiber link.

4. The local controller of claim 2, wherein, before the processing device measures the accumulated losses of the fiber link, the instructions enable the processing device to
determine a fiber loss over an entire length of the fiber link when the fiber link is free of a physical distress or pinch, and
calibrate the baseline loss based on the fiber loss when the entire length of the fiber link is free of the physical distress or pinch.

5. The local controller of claim 1, wherein an amplifier in communication with the local controller is configured to at least partially compensate for the accumulated losses in response to a gain or attenuation adjustment to an actuator associated with the amplifier.

6. The local controller of claim 5, wherein the compensation shortfall is determined by subtracting the gain or attenuation adjustment from the accumulated losses.

7. The local controller of claim 1, wherein the compensation shortfall is transmitted to the one or more downstream controllers for compensation for the accumulated losses in multiple stages.

8. The local controller of claim 1, wherein the compensation shortfall is transmitted to at least one downstream controller of a downstream Optical Multiplex Section (OMS).

9. The local controller of claim 1, wherein the accumulated losses are measured by comparing a total power received at a downstream end of the fiber link and a total power launched at an upstream end of the fiber link.

10. The local controller of claim 9, wherein an external controller compares the total power received and the total power launched to measure the accumulated losses and applies the accumulated losses to the local controller.

11. A non-transitory computer-readable medium configured to store computer logic having instructions that, when executed, cause one or more processing devices to
measure accumulated losses over a fiber link,
at least partially compensate for the accumulated losses, and
in response to determining that there is a compensation shortfall with respect to the accumulated losses, transmit the compensation shortfall to one or more downstream controllers.

12. The non-transitory computer-readable medium of claim 11, wherein the accumulated losses are compared with a baseline loss to determine a fiber loss change, and wherein the fiber loss change is due to at least one of a physical distress of the fiber link, a pinch of the fiber link, and aging of the fiber link.

13. The non-transitory computer-readable medium of claim 12, wherein, before measuring the accumulated losses of the fiber link, the instructions cause the one or more processing devices to
determine a fiber loss over an entire length of the fiber link when the fiber link is free of a physical distress or pinch, and
calibrate the baseline loss based on the fiber loss when the entire length of the fiber link is free of the physical distress or pinch.

14. The non-transitory computer-readable medium of claim 11, wherein the instructions cause the one or more processing devices to adjust a gain or attenuation of an actuator associated with an amplifier to at least partially compensate for the accumulated losses, and wherein the compensation shortfall is determined by subtracting the gain or attenuation adjustment from the accumulated losses.

15. The non-transitory computer-readable medium of claim 11, wherein the compensation shortfall is transmitted to the one or more downstream controllers for compensating for the accumulated losses in multiple stages in at least one of an Optical Multiplex Section (OMS) that includes the fiber link and a downstream OMS.

16. The non-transitory computer-readable medium of claim 11, wherein the accumulated losses are measured by comparing a total power received at a downstream end of the fiber link and a total power launched at an upstream end of the fiber link, and wherein one of an external controller and a local controller connected to a downstream end of the fiber link is configured to compare the total power received and the total power launched to measure the accumulated losses for at least partially compensating for the accumulated losses at the local controller.

17. A method comprising the steps of
measuring accumulated losses over a fiber link,
at least partially compensating for the accumulated losses,
in response to determining that there is a compensation shortfall with respect to the accumulated losses, transmitting the compensation shortfall to one or more downstream controllers.

18. The method of claim 17, further comprising the step of comparing the accumulated losses with a baseline loss to determine a fiber loss change.

19. The method of claim 17, wherein, before measuring the accumulated losses of the fiber link, the method comprising the steps of
determining a fiber loss over an entire length of the fiber link when the fiber link is free of a physical distress or pinch, and
calibrate the baseline loss based on the fiber loss when the entire length of the fiber link is free of the physical distress or pinch.

20. The method of claim 17, wherein the step of at least partially compensating for the accumulated losses includes adjusting an actuator of an amplifier to provide a gain or attenuation adjustment, and wherein the step of determining the compensation shortfall includes subtracting the gain or attenuation adjustment from the accumulated losses.

\* \* \* \* \*